United States Patent
Kim et al.

(10) Patent No.: US 10,345,793 B2
(45) Date of Patent: Jul. 9, 2019

(54) FLEXIBLE ASSEMBLY SYSTEM FOR MULTI-PRODUCT PRODUCTION, AND METHOD OF RECONFIGURING PRODUCTION LINE

(71) Applicant: ELECTRONICS AND TELECOMMUNICATIONS RESEARCH INSTITUTE, Daejeon (KR)

(72) Inventors: Hyun Jong Kim, Cheongju-si (KR); Yong Kwi Lee, Daejeon (KR); Hark Jin Lee, Daejeon (KR); Young Ae Jeon, Daejeon (KR); Jun Hee Park, Daejeon (KR); Ji Yeon Son, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/828,803

(22) Filed: Dec. 1, 2017

(65) Prior Publication Data
US 2018/0307215 A1   Oct. 25, 2018

(30) Foreign Application Priority Data

Apr. 21, 2017 (KR) .................. 10-2017-0051862

(51) Int. Cl.
G06F 7/00 (2006.01)
G05B 19/418 (2006.01)

(52) U.S. Cl.
CPC ... G05B 19/41845 (2013.01); G05B 19/4185 (2013.01); G05B 19/41805 (2013.01);
(Continued)

(58) Field of Classification Search
None
See application file for complete search history.

(56) References Cited

U.S. PATENT DOCUMENTS 6,094,603 A * 7/2000 Ishii .................. G06Q 10/06
700/97
6,345,208 B1 * 2/2002 Yoshiyuki ........ G05B 19/41865
700/97
(Continued)

FOREIGN PATENT DOCUMENTS

KR   10-2001-0011837 A   2/2001
KR       10-1057614 B1   8/2011
KR   10-2012-0133362 A  12/2012

OTHER PUBLICATIONS

Hyun Jong Kim et al. "Implementation of Reconfigurable Assembly Module using Self Device Profiling Method", International Symposium on Green Manufacturing and Applications, Jun. 2016.
(Continued)

*Primary Examiner* — Yolanda R Cumbess
(74) *Attorney, Agent, or Firm* — LRK Patent Law Firm

(57) ABSTRACT

A flexible assembly system for multi-product production and a method of reconfiguring a production line for multi-product production. A method of designing a production line includes configuring reconfigurable assembly modules (RAMs) for each production process of the production line using components included in a production line configuring tool, verifying a production amount of each of the RAMs using a production line simulator, designing the production line using RAMs with a production amount greater than or equal to a threshold value, and transmitting design information of the production line to an onsite production line installer terminal.

9 Claims, 13 Drawing Sheets

(52) U.S. Cl.
CPC . *G05B 19/41865* (2013.01); *G05B 19/41875* (2013.01); *G05B 19/41885* (2013.01); *G05B 19/4183* (2013.01); *Y02P 90/02* (2015.11)

(56) References Cited

U.S. PATENT DOCUMENTS

| | | | |
|---|---|---|---|
| 2012/0011326 A1* | 1/2012 | Higashijima | G06F 12/0804 711/142 |
| 2015/0349136 A1 | 12/2015 | Koo et al. | |
| 2016/0274391 A1 | 9/2016 | Kang et al. | |

OTHER PUBLICATIONS

Hyun Jong Kim et al., "ICT Convergence-based Application Service Development to Support the Re-configurabiliby of Door Trim Assembly Line", ICTC, Oct. 2016.

\* cited by examiner

FLEXIBLE ASSEMBLY SYSTEM FOR MULTI-PRODUCT PRODUCTION, AND METHOD OF RECONFIGURING PRODUCTION LINE

CROSS-REFERENCE TO RELATED APPLICATION(S)

This application claims the priority benefit of Korean Patent Application No. 10-2017-0051862, filed Apr. 21, 2017, in the Korean Intellectual Property Office, the disclosure of which is incorporated herein by reference for all purposes.

BACKGROUND

1. Field

One or more example embodiments relate to a flexible assembly system and a method of reconfiguring or reconstructing a production line to more rapidly and flexibly respond to a change in a production model or a production plan.

2. Description of Related Art

Nowadays manufacturers are launching new models more quickly and offering various options to meet various needs of consumers. To remain competitive in such a market environment, manufacturers need to develop a reconfigurable and flexible assembly system and technology to produce higher-quality products at lower costs and also respond more quickly to market changes and consumer demands.

As the demand for diversified yet small-quantity products increases and new model release cycles are shortened in various manufacturing industries, profits that manufacturers may earn are decreasing due to an increase in cost for constructing a production line for a new model and an increase in amount of time consumed for constructing the production line.

Thus, easy and simple reconfiguration may need to be enabled to newly construct or reconstruct a production line more rapidly at lower costs in preparation for a release of a new model and a change in production plan. In addition, a method for platform integration and a method of producing various types of products in a single production line may need to be introduced to increase a sharing or common use rate of components when developing new models to easily apply components of various specifications.

SUMMARY

An aspect provides a system and a method that may design an optimized production line by simulating a designed production line and verifying in advance whether the designed production line satisfies a target production amount.

Another aspect also provides an apparatus and a method that may configure or construct, or reconfigure or reconstruct, a production line more rapidly and accurately by transmitting design information of the production line to an onsite production line installer and arranging standardized reconfigurable assembly modules (RAMs), and verifying a configuration state of each of assembly tool components connected to the RAMS through a network.

According to an example embodiment, there is provided a method of designing a production line, the method including configuring RAMs for each production process of the production line using components included in a production line configuring tool, verifying a production amount of each of the RAMs using a production line simulator, designing the production line using RAMs with a production amount greater than or equal to a threshold value, and transmitting design information of the production line to an onsite production line installer terminal.

The design information of the production line includes arrangement information of assembly modules included in the production line and configuration information of each of the assembly modules included in the production line.

According to another example embodiment, there is provided a method of verifying a RAM, the method including searching, by a RAM configured based on design information of a production line, for components connected to the RAM, transmitting a list of retrieved components to a production line designer terminal, transmitting a production line arrangement verification request message that requests verification of arrangement of the production line to the production line designer terminal in response to the production line designer terminal verifying that the retrieved components correspond to the design information of the production line, and receiving, from the production line designer terminal, a name and an identification number of a production process to be performed by the RAM.

The production line designer terminal may configure RAMs for each production process of the production line using components included in a production line configuring tool, and design the production line using RAMs with a production amount greater than or equal to a threshold value. Here, the production amount may be verified using a production line simulator.

In response to no component being absent from the list of the components among components included in the design information of the designed production line, the production line designer terminal may verify that the retrieved components correspond to the design information of the production line.

According to still another example embodiment, there is provided a method of reconfiguring a production line, the method including configuring RAMs for each production process of the production line and estimating a production amount of each of the RAMs using a production line simulator, designing the production line based on a result of the estimating of the production amount of each of the RAMs, receiving, from a RAM configured based on design information of the production line among the RAMs, a list of components connected to the RAM, verifying the RAM by comparing the list of the components to the design information of the production line, receiving, from the RAM, a production line arrangement verification request message to request verification of arrangement of the production line, and transmitting, to the RAM, a name and an identification number of a production process to be performed by the RAM.

The designing of the production line may include designing the production line using RAMs with a production amount greater than or equal to a threshold value.

The design information of the production line may include arrangement information of assembly modules included in the production line and configuration information of each of the assembly modules included in the production line.

The verifying of the RAM may include verifying that the components connected to the RAM correspond to the design information of the production line in response to no component being absent from the list of the components among components included in the design information of the designed production line.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
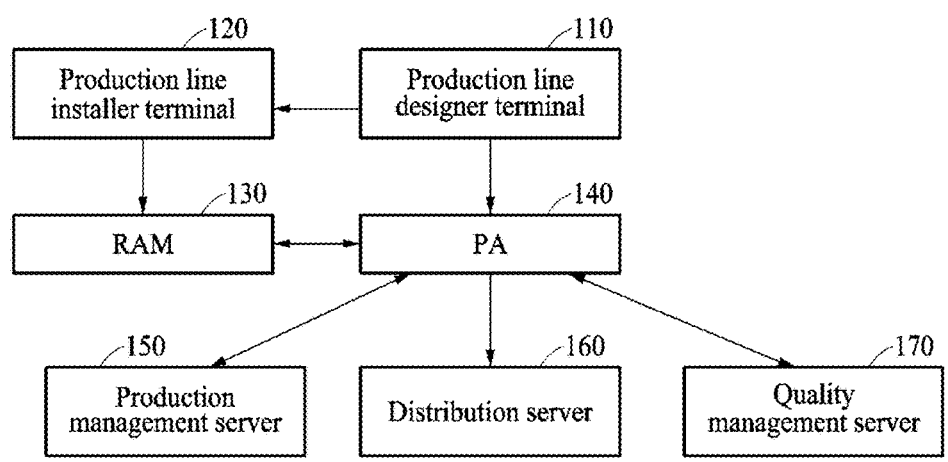
FIG. 1 is a diagram illustrating a flexible assembly system according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the present disclosure that one component is "connected," "coupled," or "joined" to another component, a third component may be "connected," "coupled," and "joined" between the first and second components, although the first component may be directly connected, coupled or joined to the second component. In addition, it should be noted that if it is described in the present disclosure that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, example embodiments will be described in detail with reference to the accompanying drawings. A method of reconfiguring or reconstructing a production line to be described hereinafter may be performed by a flexible assembly system. The method of reconfiguring or reconstructing a production line will be hereinafter simply referred to as a production line reconfiguring method.

FIG. 1 is a diagram illustrating a flexible assembly system according to an example embodiment.

Referring to FIG. 1, a flexible assembly system includes a production line designer terminal 110, a production line installer terminal 120, a reconfigurable assembly module (RAM) 130, a planning actuator (PA) 140, a production management server 150, a distribution server 160, and a quality management server 170.

The production line designer terminal 110 refers to a terminal that is used by a production line designer to reconfigure or reconstruct a production line when a production model or a production plan changes, or when a production model or a production plan is added.

The production line designer terminal 110 may include a production line configuring tool to design the production line, and a production line simulator to simulate the designed production line and verify in advance whether the designed production line meets a target production amount.

In addition, the production line designer terminal 110 may transmit design information of the designed production line to the production line installer terminal 120.

The production line installer terminal 120 refers to a terminal that is possessed and used by an onsite production line installer who installs the production line on site. The production line installer terminal 120 may be a small-sized terminal, such as, for example, a smartphone, a tablet personal computer (PC), and a mobile handset manufacturer (HM), that may communicate wirelessly, and may be small in size to such an extent that the production line installer may carry around while installing the production line. The production line installer terminal 120 may provide the production line installer with the design information of the production line that is received from the production line designer terminal 110.

In addition, the production line installer may arrange the RAM 130 that is standardized based on the design information provided by the production line installer terminal 120, and connect components required for each production process to the RAM 130.

The RAM 130 may be a standard workbench that is inserted into the production line. The RAM 130 may be combined with an assembly tool, or a component, that is required for production and/or assembly in each process of the production line, and may also be variously configured depending on a purpose of use. In addition, the RAM 130 may verify components connected by the production line installer, and transmit information associated with the connected components to the PA 140 for verification.

The PA 140 may link the production line designer terminal 110 and the RAM 130 to the production management server 150, the distribution server 160, and the quality management server 170 to interwork with one another.

The production management server 150 refers to a server configured to monitor a state of the production line. The production management server 150 may be, for example, a manufacturing execution system (MES).

The distribution server 160 refers to a server configured to manage a logistics movement inside a factory where the flexible assembly system is installed.

The quality management server 170 refers to a server configured to manage or control qualities of products produced in the production line.

As described, the flexible assembly system may simulate a designed production line and verify in advance whether the designed production line meets a target production amount, and thus may design an optimized production line.

In addition, the flexible assembly system may arrange a standardized RAM by transmitting design information of the production line to an onsite production line installer, and verify a configuration state of each of assembly tool components connected to the RAM through a network, and thus may configure or reconfigure the production line more rapidly and accurately.

Figure 2:
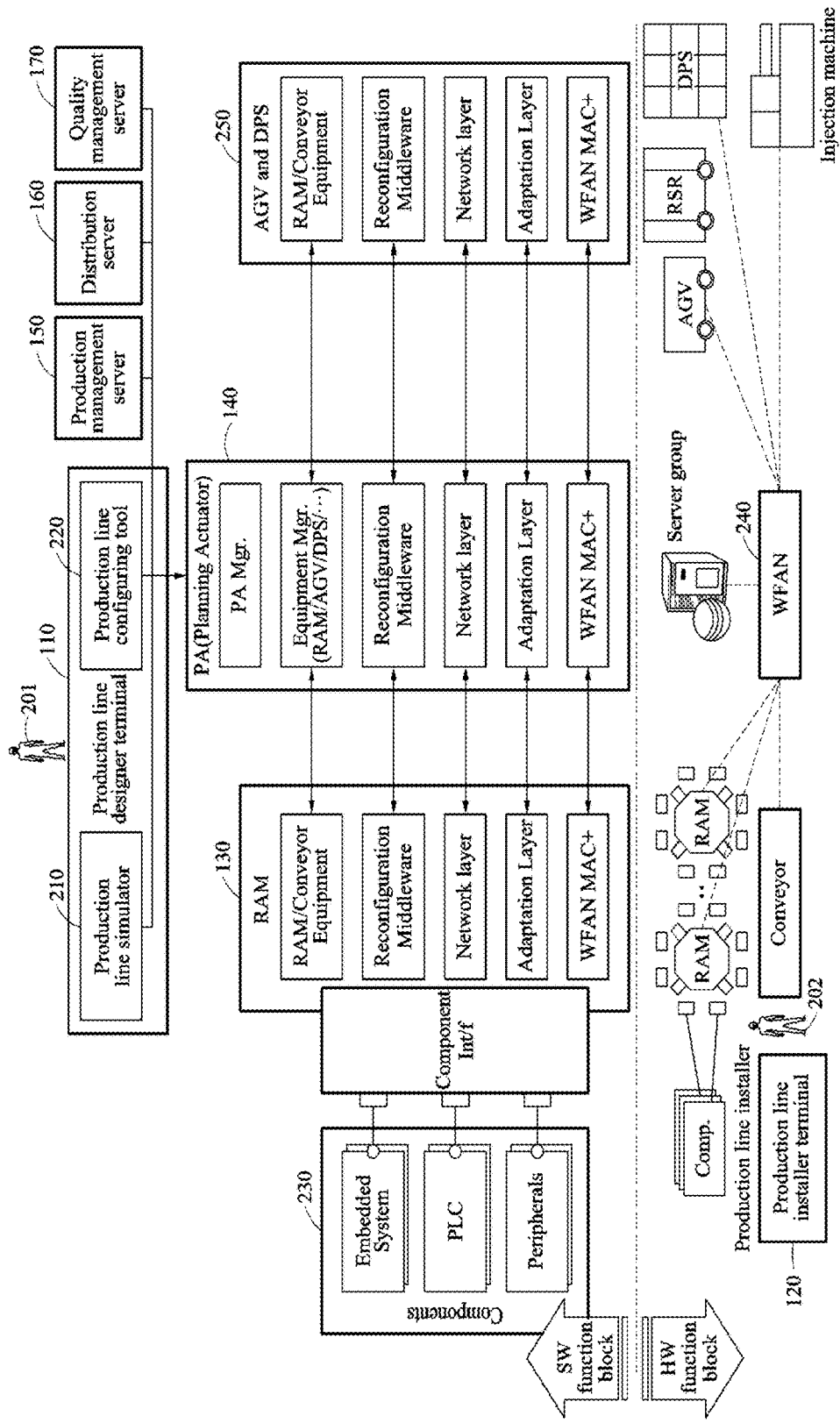
FIG. 2 is a diagram illustrating a software configuration and a hardware configuration included in a flexible assembly system according to an example embodiment.

FIG. 2 is a diagram illustrating a software configuration and a hardware configuration included in a flexible assembly system according to an example embodiment.

Referring to FIG. 2, a flexible assembly system includes a production line designer terminal 110, a production line installer terminal 120, a RAM 130, a PA 140, a production management server 150, a distribution server 160, a quality management server 170, a component 230 to be connected to the RAM 130, a wireless factory area network (WFAN) 240, and a distribution device 250.

As illustrated in FIG. 2, the production line installer terminal 110 includes a production line simulator 210 and a production line configuring tool 220, and may be a terminal that is used by a production line designer 201.

The production management server 150 may support a function of an existing MES. In addition, the production management server 150 may interwork with the distribution server 160 and the quality management server 170 to timely provide components of specifications to a reconfigurable production line and support a predictive quality maintenance function based on working environment information and installation state information of the production line.

The PA 140 may support a reconfiguration function of an existing production line including an MES. In addition, in a case in which a production line is newly configured or reconfigured, the PA 140 may determine when to apply reference information that is changed based on a new configuration or reconfiguration of the production line.

A method of reconfiguring a production line, hereinafter simply referred to as a production line reconfiguring method, to be performed by the flexible assembly system to produce multiple types of products may include an operation of designing the production line, an operation of verifying a configuration of a component and registering the component, an operation of verifying arrangement of the production line, and an operation of operating the production line.

In the operation of designing the production line, the production line designer 201 may newly configure or reconfigure the production line based on an added or changed production model or plan, using the production line configuring tool 220. Here, the production line simulator 210 may perform a simulation of the production line based on an arrangement structure, an assigned workforce, and reference information of the production line designed by the production line designer 201 using the production line configuring tool 220. The production line simulator 210 may perform the simulation of the production line designed by using the production line configuring tool 220, and verify whether the production line meets a planned target production amount before applying the production line.

When the production line is verified to meet the planned target production amount after the simulation of the production line is performed, the production line designer terminal 110 may transmit, to the production line installer terminal 120, design information of the production line designed by using the production line configuring tool 220. The production line installer terminal 120 may then provide the design information of the production line to an onsite production line installer 202.

The production line installer 202 may then arrange the RAM 130 based on the design information of the production line and connect the component 230, which may be provided as a plurality of components, to the RAM 130. Here, the components 230 may be tools or equipment required for assembly in each production process.

The RAM 130 may communicate with the PA 140 and the distribution device 250, for example, an automated guided vehicle (AGV) and a digital picking system (DPS) as illustrated in FIG. 2, through the WFAN 240. In addition, the RAM 130 may request the PA 140 to verify whether the components 230 corresponding to the design information of the production line are connected to the RAM 130, and receive a result of the verifying.

Figure 3:
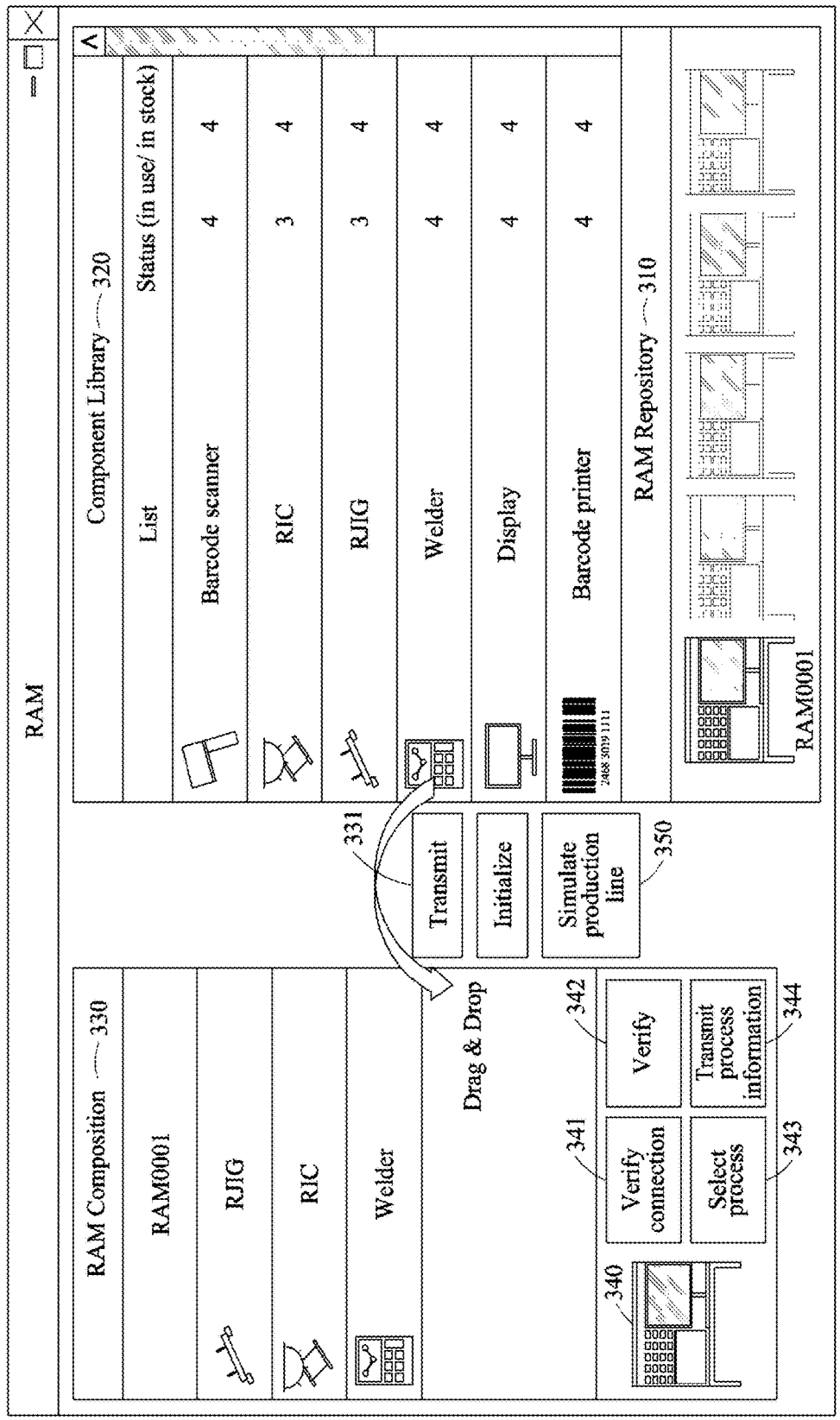
FIG. 3 is a diagram illustrating an example of a production line configuring tool according to an example embodiment.

FIG. 3 is a diagram illustrating an example of a production line configuring tool according to an example embodiment.

Referring to FIG. 3, a production line configuring tool 220 may display, for a production line designer 201, a RAM repository 310 that is a standard assembly module repository, a component library view 320, and a RAM composition window 330.

When the production line designer 201 selects a single assembly module from the RAM repository 310 to place it in the RAM composition window 330, and selects components required for a corresponding workbench from the component library view 320 to move it to the RAM composition window 330, the production line configuring tool 220 may configure an assembly module required for a single process using the assembly module and the components moved to the RAM composition window 330. For example, components used herein may be at least one of a barcode scanner, a barcode printer, a reconfigurable jig (RJIG), a welder, an electric driver, a vision tester, or a sensor module, which are tools and equipment required for a production process. However, various components may also be applied in addition to the examples described in the foregoing based on a production process and a product to be produced.

When the production line designer 201 selects a transmit icon 331, the production line configuring tool 220 may transmit, to a production line installer terminal 120, design information of a production line that includes information associated with configured assembly modules.

When the production line designer 201 selects a simulate production line icon 350, the production line configuring tool 220 may transmit, to a production line simulator 210, the design information including the information associated with configured assembly modules such that the production line simulator 210 may perform a simulation of the production line.

When a component configuration verification message that requests verification of a component configuration is received from the RAM 130, the production line configuring tool 220 may display the RAM 130 transmitting the component configuration verification message as illustrated by 340, and activate an icon 341 indicating that connection verification is requested. Here, the production line configuring tool 220 may verify whether components connected to the RAM 130 transmitting the component configuration verification message are configured according to the design information of the production line.

In addition, when the production line designer 201 verifying the icon 341 indicating that the connection verification is requested selects a verify icon 342, the production line configuring tool 220 may verify whether the components connected to the RAM 130 transmitting the component configuration verification message are configured according to the design information of the production line.

When a production line arrangement verification message that requests verification of arrangement of the production line is received from the production line installer terminal 120, the production line configuring tool 220 may assign a process name and number to the RAM 130 using a select process icon 343 and a transmit process information icon 344.

The RAM 130 may then display the process name and number assigned by the production line configuring tool 220. Subsequently, an onsite production line installer 202 or the production line installer terminal 120 may verify the process name and number displayed by the RAM 130 to verify whether the RAM 130 corresponds to arrangement information included in the design information of the production line. When the RAM 130 is verified to correspond to the arrangement information included in the design information of the production line, the production line installer terminal 120 may notify a PA 140 that the verification of the arrangement is completed.

Figure 4:
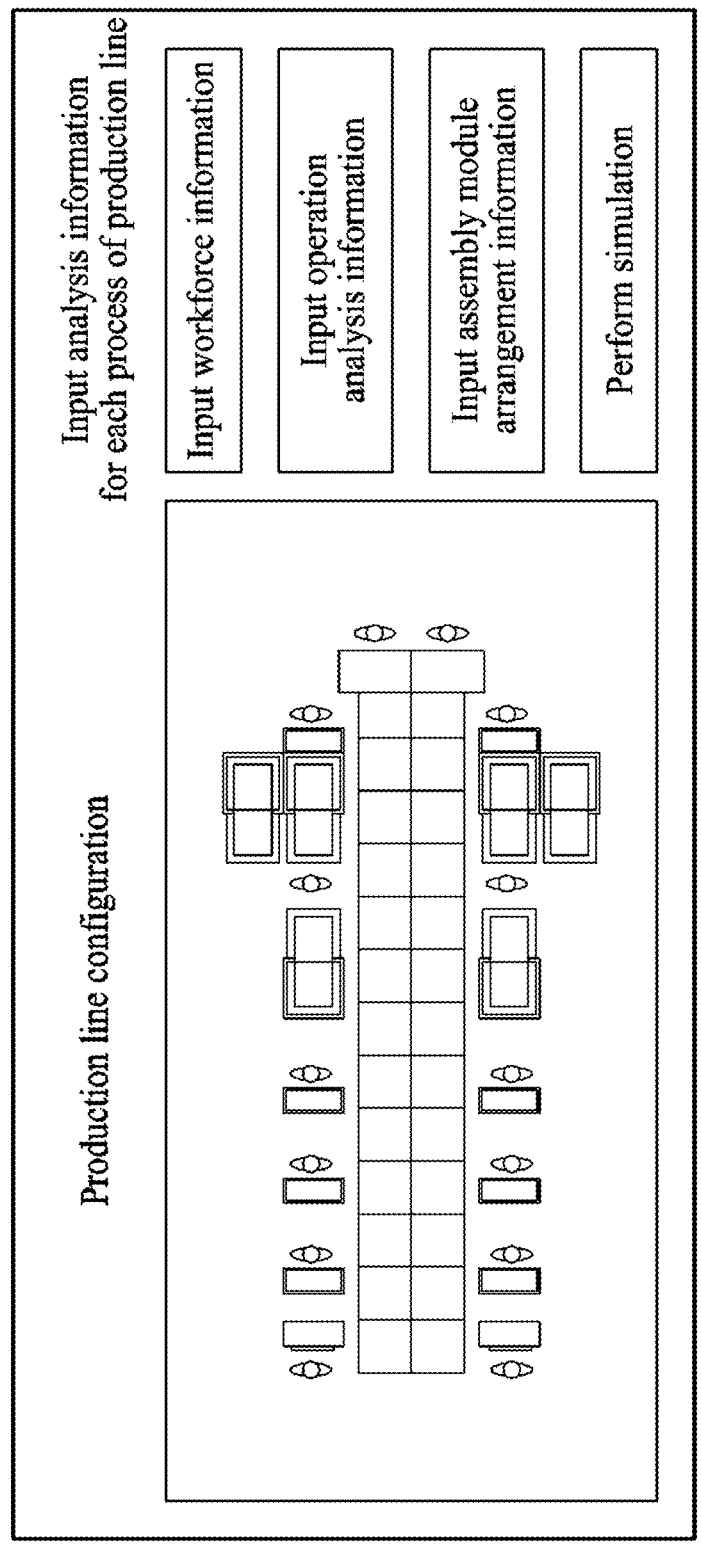
FIG. 4 is a diagram illustrating an example of a production line simulation according to an example embodiment.

FIG. 4 is a diagram illustrating an example of a production line simulation according to an example embodiment.

Referring to FIG. 4, a production line simulator 210 may perform a simulation of a production line by inputting information, for example, workforce information associated with a workforce to be input to the production line, operation analysis information of each process, and assembly module arrangement information, based on design information of the production line. The production line simulator 210 may estimate a production amount of the production line based on a result of the simulation, and verify whether the estimated production amount exceeds a target production amount.

Figure 5:
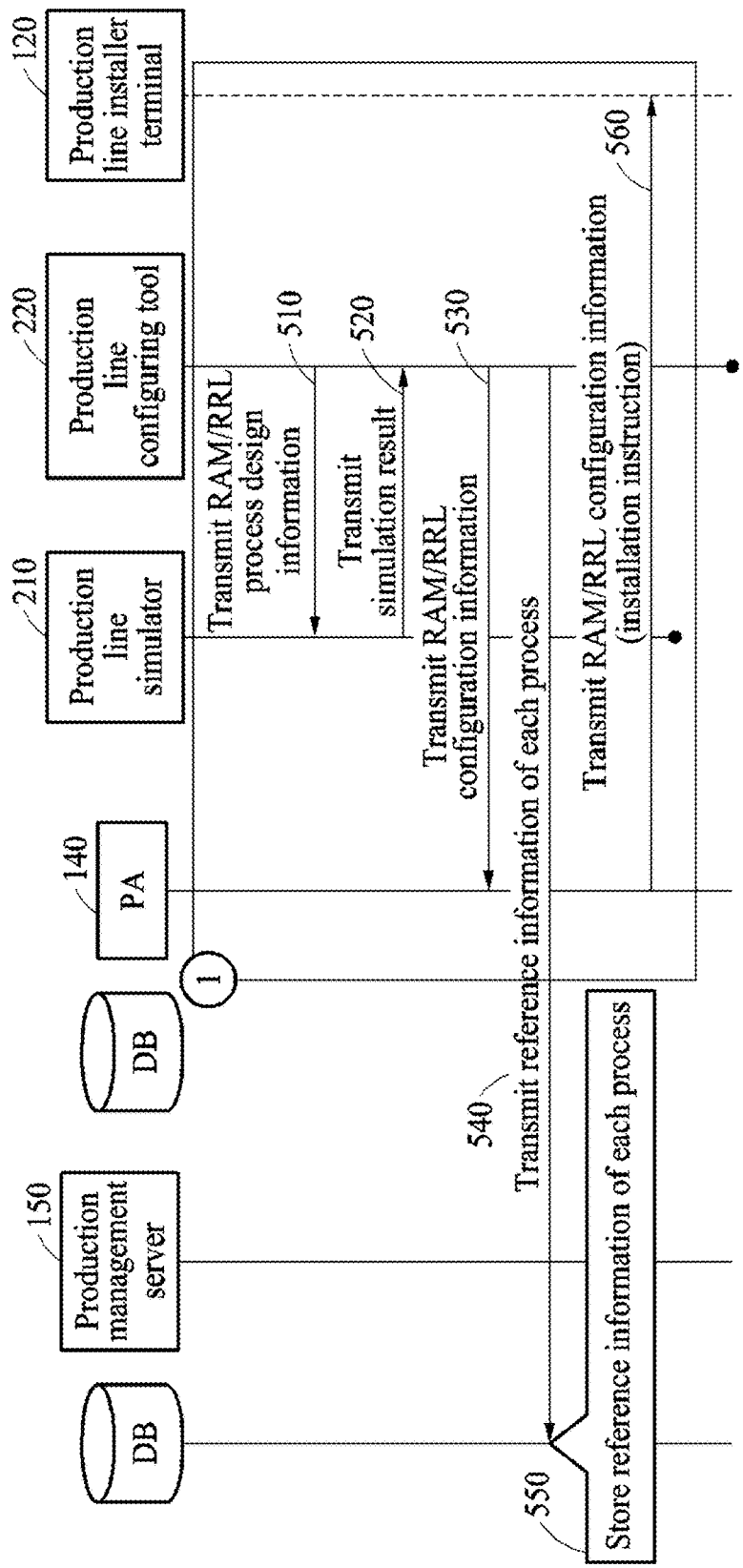
FIG. 5 is a diagram illustrating a method of designing a production line according to an example embodiment.
Figure 6:
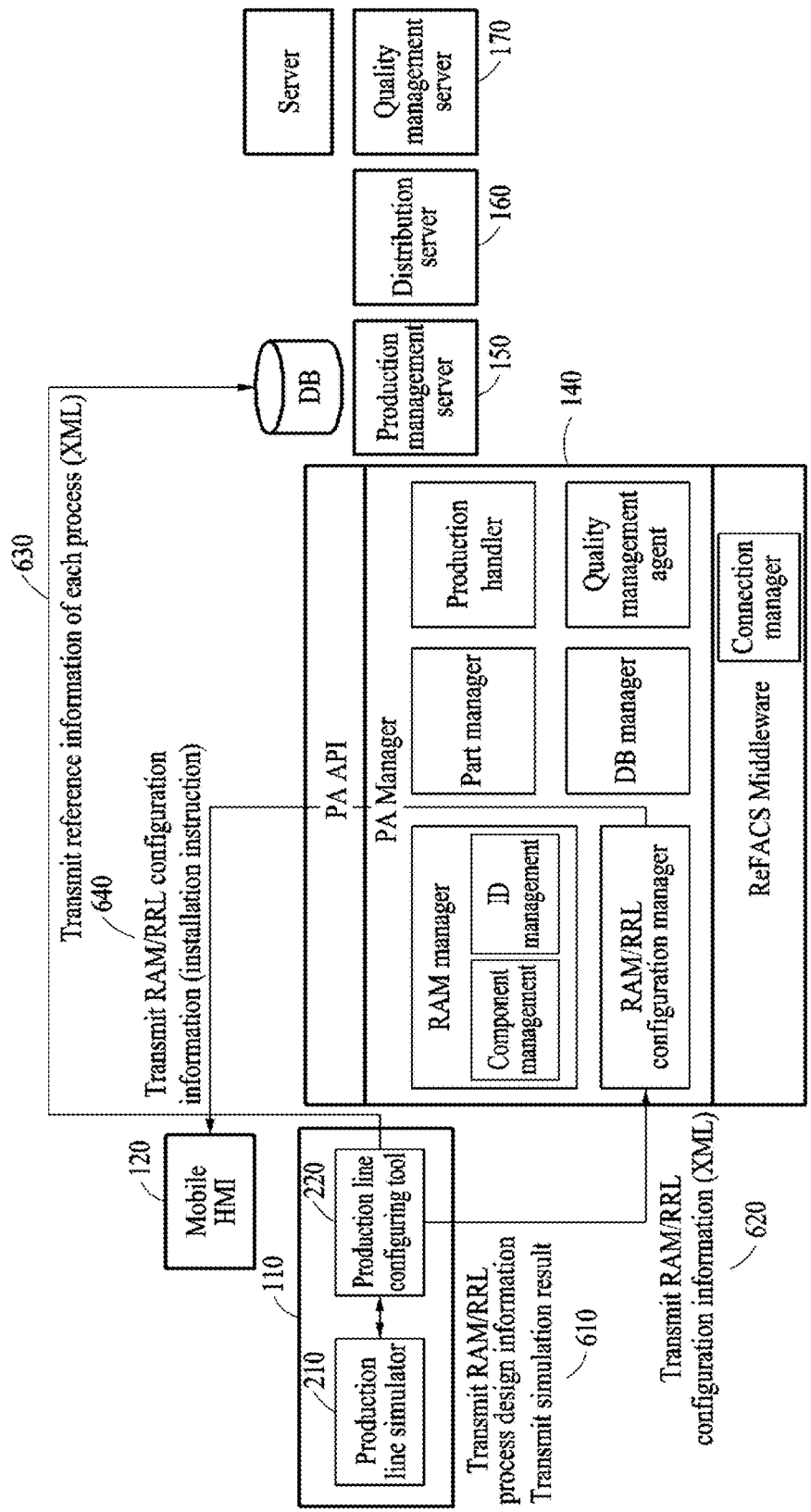
FIG. 6 is a diagram illustrating examples of messages that are transmitted and received to and/or from system components in a method of designing a production line according to an example embodiment.

FIG. 5 is a diagram illustrating a method of designing a production line according to an example embodiment. The method of designing a production line will be hereinafter simply referred to as a production line designing method. FIG. 6 is a diagram illustrating examples of messages that are transmitted and received to and/or from system components in the production line designing method of FIG. 5.

Referring to FIGS. 5 and 6, in operation 510, a production line configuring tool 220 transmits design information 610 of a production line, for example, RAM/Relocatable Reconstruction Line (RRL) process design information, to a production line simulator 210. The production line simulator 210 then performs a simulation of the production line based on the received design information 610.

In operation 520, the production line simulator 210 transmits a result of the simulation performed in operation 510 to the production line configuring tool 220. In response to the result of the simulation exceeding a target production amount, the production line configuring tool 220 may perform operation 530.

In operation 530, the production line configuring tool 220 transmits design information 620 of the production line, for example, RAM/RRL configuration information, to a PA 140.

In operation 540, the production line configuring tool 220 transmits, to a database (DB) of a production management server 150, production line design information in a form of reference information 630 of each process.

In operation 550, the DB of the production management server 150 stores the production line design information in the form of the reference information 630 of each process, which is received in operation 540, and manages the stored production line design information.

In operation 560, the PA 140 transmits, to a production line installer terminal 120, the production line design information received in operation 540 in a form of installation instruction 640.

Here, the production line installer terminal 120 receives the installation instruction 640 through a mobile network or WiFi in a factory. The production line installer terminal 120 then displays, for an onsite production line installer 202, configuration information of a RAM 130 and production line configuration information based on the received installation instruction 640.

Figure 7:
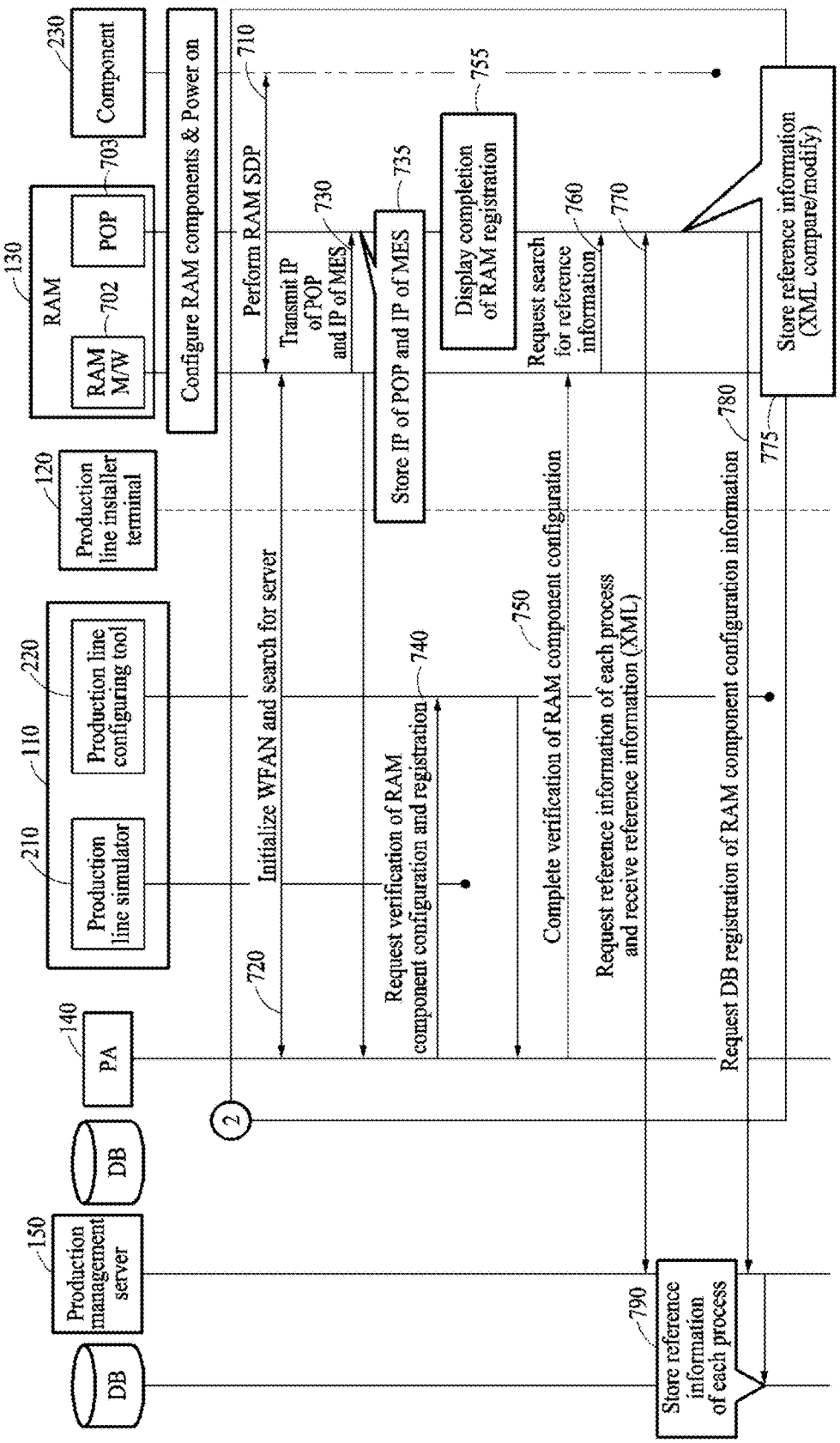
FIG. 7 is a diagram illustrating a method of verifying a component of a reconfigurable assembly module (RAM) according to an example embodiment.
Figure 8:
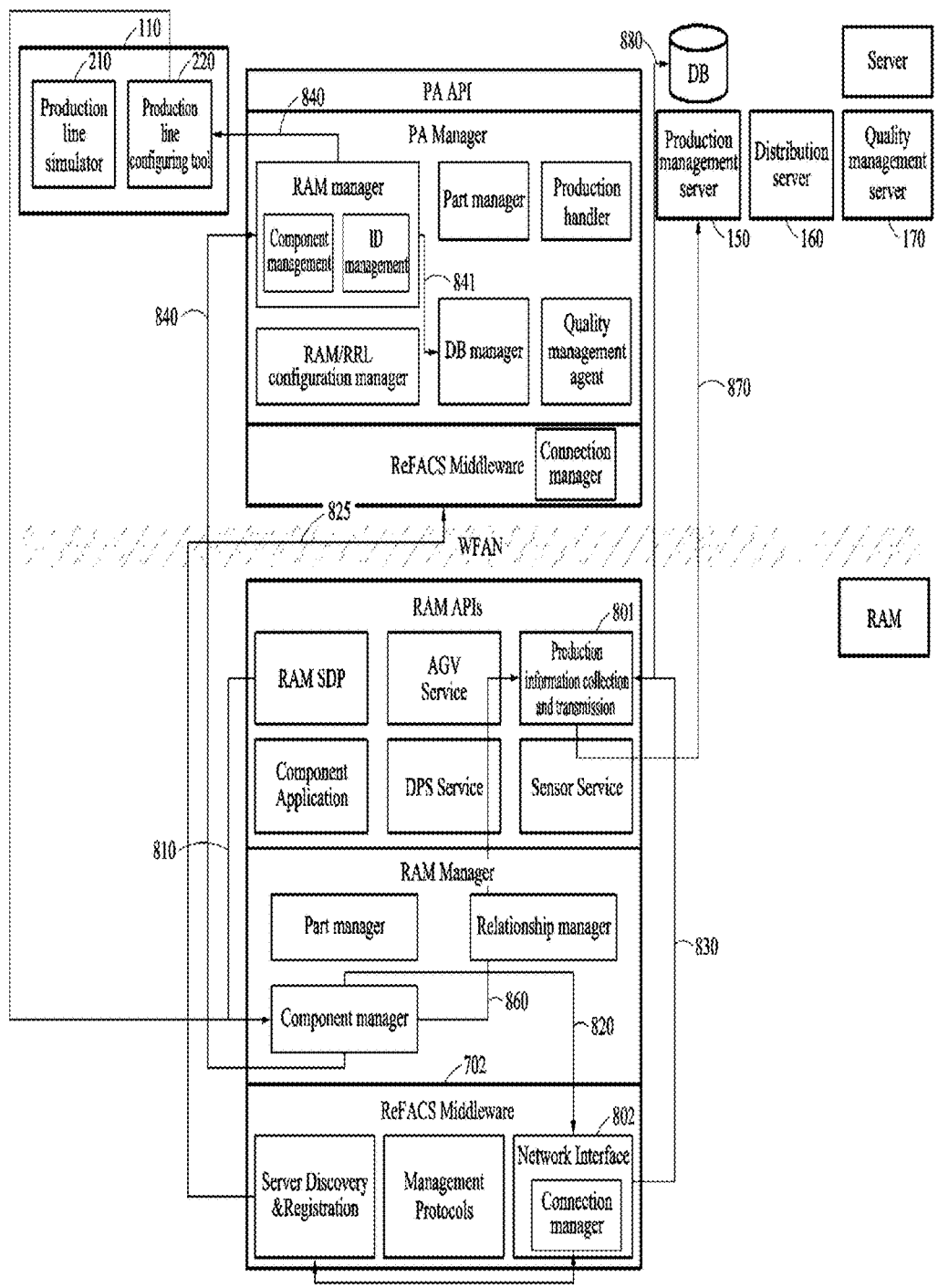
FIG. 8 is a diagram illustrating examples of messages that are transmitted and received to and/or from system components in a method of verifying a component of a RAM according to an example embodiment.

FIG. 7 is a diagram illustrating a method of verifying a component of a RAM according to an example embodiment. The method of verifying a component of a RAM will be hereinafter simply referred to as a RAM component verifying method. FIG. 8 is a diagram illustrating examples of messages that are transmitted and received to and/or from system components in the RAM component verifying method of FIG. 7.

Referring to FIGS. 7 and 8, in operation 710, a RAM self device profiling (SDP) application included in an application program interface (API) 701 of a RAM 130 instructs a component manager of a RAM manager to perform SDP as illustrated by 810. The SDP may be a method of identifying components connected to the RAM 130. In addition, operation 710 may be performed by the RAM 130 to which power is applied when an onsite production line installer 202 connects the components to the RAM 130 according to an installation instruction displayed on a production line installer terminal 120 and then applies power to the RAM 130.

The RAM SDP application included in the API 701 may define reference information based on a component 230 identified through the SDP.

In operation 720, the component manager requests a network interface 802 included in a Reconfigurable manufacturing technology based on the Flexible Assembly and ICT Converged System (ReFACS) middleware 702 to initialize a WFAN 240 and connect to the WFAN 240 as illustrated by 820. In addition, the component manager searches for a server included in a flexible assembly system, such as, for example, a production management sever 150, and registers the RAM 130 in a PA 140 as illustrated by 825. Here, the component manager obtains, from the PA 140, point of production (POP) internet protocol (IP) and production management server IP information.

In operation 730, the ReFACS middleware 702 transmits the POP IP and production management server IP information that are obtained in operation 720 to a POP 703, which is a production information collection and transmission API 801, as illustrated by 830.

In operation 735, the POP 703 stores the POP IP and production management server IP information that is received in operation 730. The POP 703 also communicates with the production management server 150 based on the POP IP and the production management server IP information. For example, the POP 703 and the production management server 150 may communicate with each other using WiFi, ZigBee, a smart utility network (SUN), and the like as the WFAN 240.

In operation 740, the component manager of the RAM manager transmits, to the RAM manager included in a PA manager of the PA 140, a RAM component configuration verification request message 840 that requests verification of configuration of RAM components through the WFAN 240. Here, operation 740 may be performed after all the components, for example, the component 230, which are connected to the RAM 130, are identified through the SDP performed in operation 710.

The PA manager receiving the RAM component configuration verification request message 840 allocates an identifier (ID) 841 to the RAM component configuration verification request message 840 and transmits, to a DB manager, the RAM component configuration verification request message 840 and the ID 841 allocated to the RAM component configuration verification request message 840. Concurrently, the PA manager transmits, to a production line configuring tool 220, the RAM component configuration verification request message 840 such that a production line designer 201 may verify the RAM component configuration verification request message 840. The production line configuring tool 220 displays the ID 841.

The production line configuring tool 220 verifies whether the component 230 connected to the RAM 130 is configured based on design information of a production line.

When there is a component being absent from among components that need to be connected to the RAM 130, the production line configuring tool 220 may display, on a RAM composition window 330, the component in a color different from that of a component that is not absent such that the production line designer 201 may readily distinguish the component from others. For example, the production line configuring tool 220 may display the component in red and another component that is not absent in yellow.

When there is no component being absent from among the components that need to be connected to the RAM 130, the production line configuring tool 220 may perform operation 750. In addition, when there is the component being absent, the production line configuring tool 220 may transmit information associated with the component to the production line installer terminal 120 such that the production line installer 202 may connect the component to the RAM 130.

In operation 750, the production line configuring tool 220 transmits a verification completion message 850 indicating completion of the verification to the component manager of the RAM manager through the WFAN 240.

In operation 755, the component manager displays the verification completion message 850 received in operation 750 such that the production line installer 202 may notice that the verification of the component configuration is completed.

In operation 760, the component manager of the RAM manager transmits, to the POP 703 among RAM APIs, reference information search request message 860 that requests a search for reference information.

In operation 770, in response to the reference information search request message 860 received in operation 760, the POP 703 transmits, to the production management server 150, process-based reference information request message 870 that requests reference information of each process. In response to the received process-based reference information request message 870, the production management server 150 transmits, to the POP 703, the reference information of each process that is stored by the production line configuring tool 220.

In operation 775, the POP 703 modifies and stores the reference information received in operation 770 based on the reference information defined in operation 710.

In operation 780, the POP 703 requests the production management server 150 to register RAM component configuration information 880, which is the reference information modified in operation 775, in a DB of the production management server 150.

In operation 790, the production management server 150 stores, as reference information of each process, the RAM component configuration information 880 received in operation 780.

Figure 9:
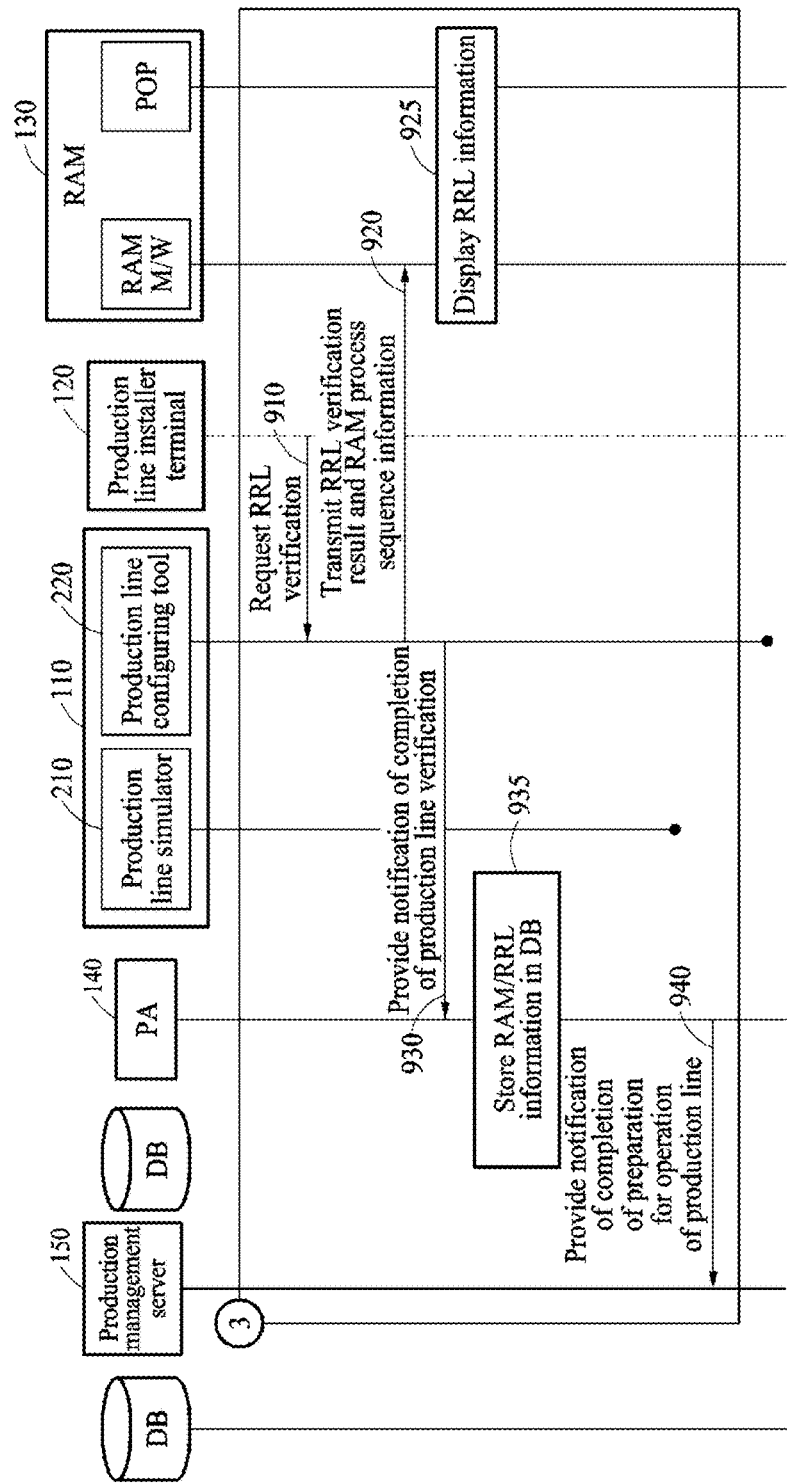
FIG. 9 is a diagram illustrating a method of verifying arrangement of a production line according to an example embodiment.
Figure 10:
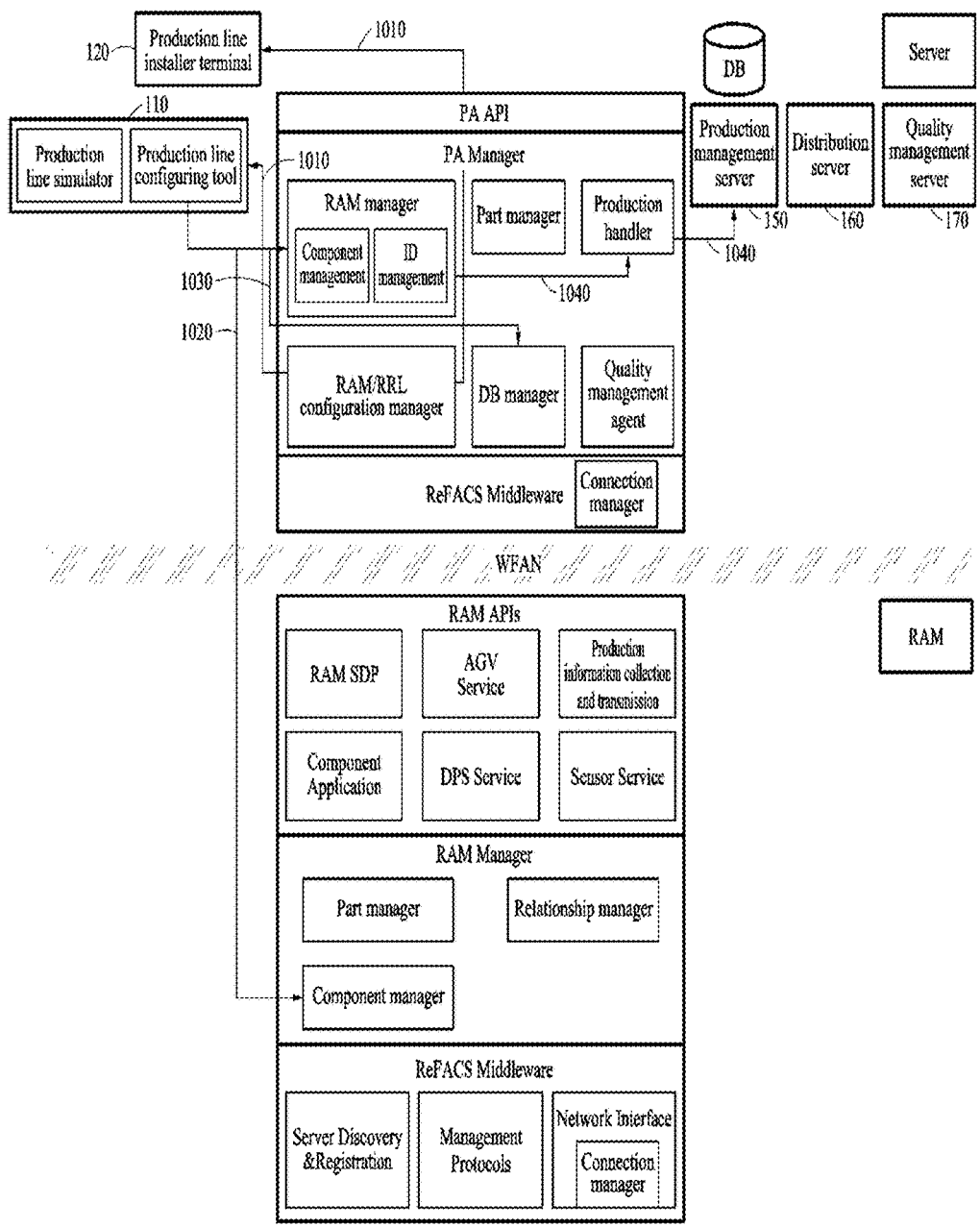
FIG. 10 is a diagram illustrating examples of messages that are transmitted and received to and/or from system components in a method of verifying arrangement of a production line according to an example embodiment.

FIG. 9 is a diagram illustrating a method of verifying arrangement of a production line according to an example embodiment. The method of verifying arrangement of a production line will be hereinafter simply referred to as a production line arrangement verifying method. FIG. 10 is a diagram illustrating examples of message that are transmitted and received to and/or from system components in the production line arrangement verifying method of FIG. 9.

Referring to FIGS. 9 and 10, in operation 910, in response to a request from an onsite production line installer 202, a production line installer terminal 120 transmits a production line arrangement verification request message 1010 that requests verification of arrangement of a production line to a production line configuring tool 220 of a production line designer terminal 110. In detail, when the production line installer terminal 120 transmits the production line arrangement verification request message 1010 to a RAM/RRL configuration manager of a PA manager, the RAM/RRL configuration manager may transmit the received production line arrangement verification request message 1010 to the production line configuring tool 220.

In operation 920, the production line configuring tool 220 allocates a process name and a process number to a RAM 130 based on an input by a production line designer 201. The production line configuring tool 220 sets the process name and the process number to be a verification result and a process sequence, respectively, and transmits verification result and process sequence information 1020 to a component manager in a RAM manager.

In operation 925, the component manager of the RAM manager displays the verification result and process sequence information 1020 received in operation 920. Here, the production line installer 202 verifies the displayed verification result and process sequence information. Here, when an arrangement order of the RAM 130 is not correct, the production line installer 202 changes arrangement of the RAM 130 based on the arrangement order. When the arrangement of the RAM 130 is not changed, the component manager of the RAM manager performs operation 930.

Here, the arrangement of the RAM 130 not changed may indicate that verification of the production line is completed, and thus the component manager of the RAM manager transmits production line information 1030 to a DB manager of a PA 140.

In operation 935, the DB manager of the PA 140 stores, in a DB, the production line information 1030 received in operation 930.

In operation 940, the component manager of the RAM manager transmits, a production handler of the PA manager, a message 1040 that provides a notification that the production line is fully ready for operation. The production hander transmits the message 1040 to a production management server 150.

Figure 11:
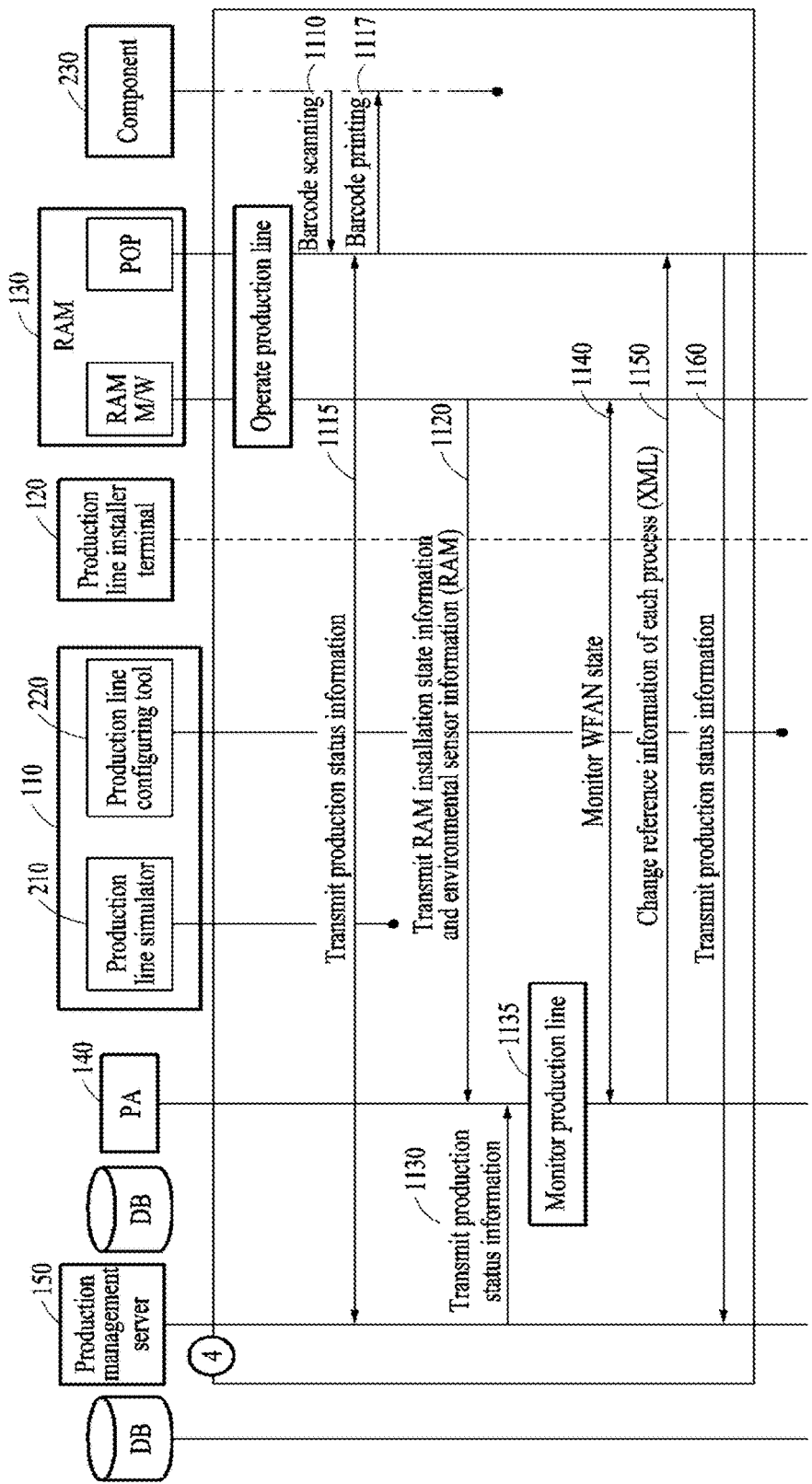
FIG. 11 is a diagram illustrating a method of operating a production line according to an example embodiment.
Figure 12:
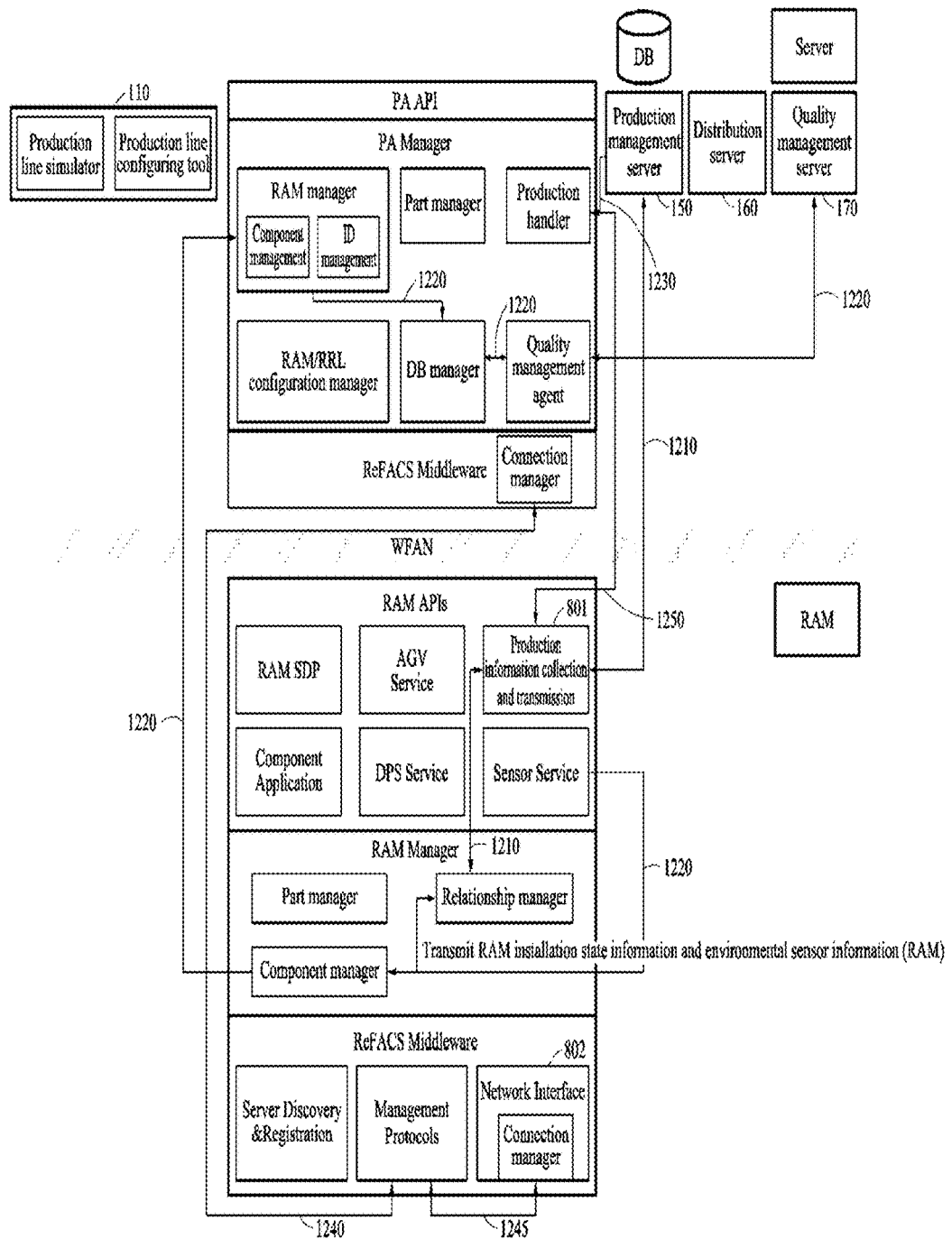
FIG. 12 is a diagram illustrating examples of messages that are transmitted and received to and/or from system components in a method of operating a production line according to an example embodiment.

FIG. 11 is a diagram illustrating a method of operating a production line according to an example embodiment. The method of operating a production line will be hereinafter simply referred to as a production line operating method. FIG. 12 is a diagram illustrating examples of messages that are transmitted and received to and/or from system components in the production line operating method of FIG. 11.

Referring to FIGS. 11 and 12, in operation 1110, a RAM 130 requests a component 230 connected to the RAM 130, for example, a barcode scanner and a barcode printer, to collect current production state information 1210 such as a barcode scanning result. The RAM 130 then receives the production state information 1210, for example, the barcode scanning result, from the component 230.

In operation 1115, the RAM 130 transmits, to a production management server 150, the production state information 1210 received in operation 1110. In addition, the production state information 1210 may also be transmitted to a component manager and a relationship manager included in a RAM manager of the RAM 130 to manage states of components connected to the RAM 130.

In operation 1120, the RAM 130 collects RAM installation state and environmental sensor information 1220 from sensor module components on a periodic basis and transmit the collected RAM installation state and environmental sensor information 1220 to a PA 140 to support predictive quality maintenance function by monitoring a working environment and an installation state of a production line. In addition, when sensed information is collected by a sensing service among RAM APIs of the RAM 130, the sensed information may be transmitted to the RAM manager of a PA manager of the PA 140 by the component manager of the RAM manager of the RAM 130.

Here, the PA 140 stores, in a DB, the RAM installation state and environmental sensor information 1220 that is collected by the RAM 130 on a periodic basis. In addition, a quality management server 170 obtains the RAM installation state and environmental sensor information 1220 by accessing the DB through a quality management agent.

In operation 1130, the production management server 150 transmits, to a production handler of the PA manager, production state information 1230 to determine a point in time at which reference information of each process of the production line is to change.

In operation 1135, the PA 140 monitors a state of the production line using the RAM installation state and environmental sensor information 1220 received in operation 1120 and the production state information 1230 received in operation 1130.

In operation 1140, a connection manager of a ReFACS middleware maintains an optimal connection state by monitoring a WFAN connection state through a management protocol of the ReFACS middleware. For example, in a case in which a WFAN 240 is configured in a double form with WiFi and an SUN, the connection manager of the ReFACS middleware transmits a control message 1240 to the management protocol of the ReFACS middleware. Here, in response to the control manage 1240, the management protocol of the ReFACS middleware transmits a message 1245 to a connection manager of a network interface 802 to select a wireless network with a suitable connection state from between the two wireless networks, and thus a connection between the RAM 130 and the PA 140 may be maintained. Here, operations 1140 and 1135 may be performed simultaneously.

In a case in which a product model and a part of a specification are changed, the production handler of the PA manager may perform operation 1150.

In operation 1150, the production handler of the PA manager changes process-based reference information 1250 of a production information collection and transmission API 801 of the RAM APIs. The process-based reference information used herein refers to reference information of each process of the production line.

In operation 1160, the RAM 130 transmits, to the production management server 150, the production state information 1210 collected based on the process-based reference information changed in operation 1150.

According to an example embodiment, a flexible assembly system and a production line for producing multiple types of products may be more rapidly and accurately reconfigured through such a series of operations described above.

Figure 13:
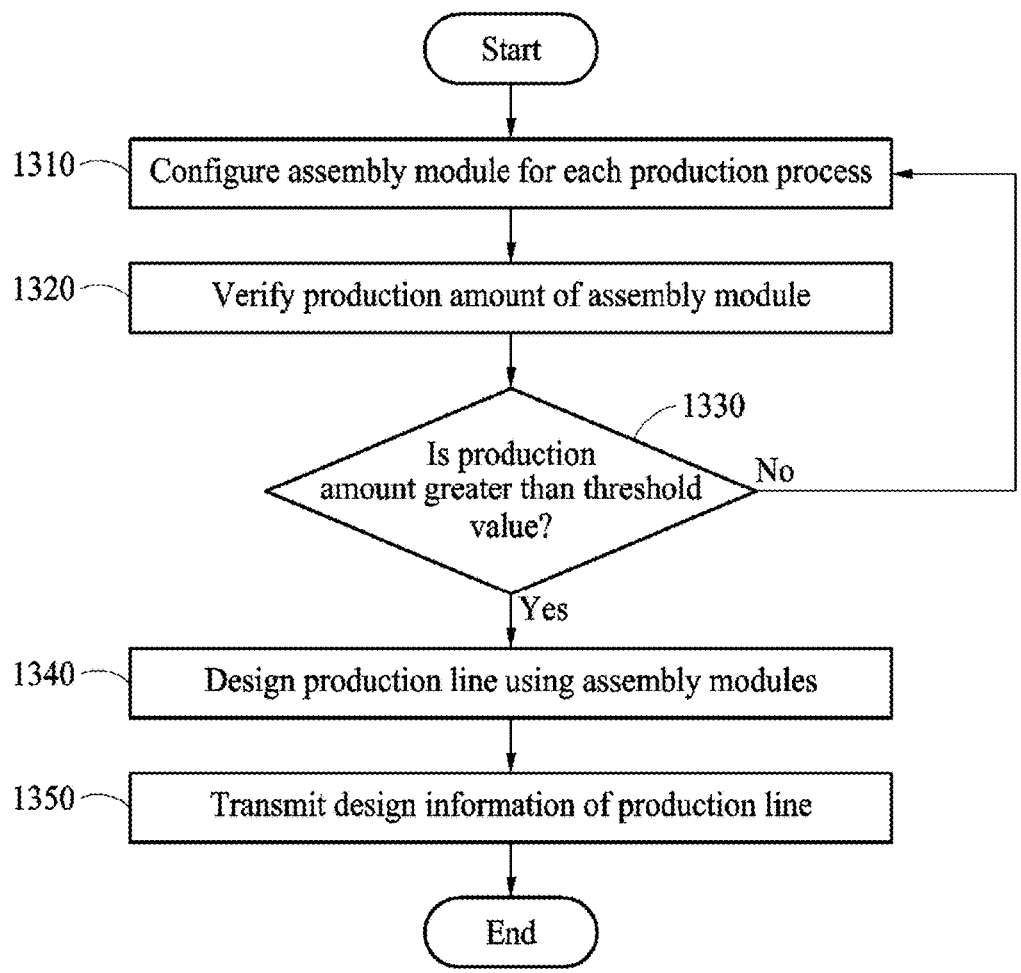
FIG. 13 is a flowchart illustrating a method of reconfiguring a production line according to an example embodiment.

FIG. 13 is a flowchart illustrating a production line reconfiguring method according to an example embodiment.

Referring to FIG. 13, in operation 1310, a production line designer terminal configures an assembly module for each production process of a production line using components included in a production line configuring tool 220.

In operation 1320, the production line designer terminal 110 verifies a production amount of the assembly module configured in operation 1310 using a production line simulator 210.

In operation 1330, the production line designer terminal 110 verifies whether the production amount verified in operation 1320 exceeds a threshold value. The threshold value used herein may be a target production amount planned for the production line.

In response to the production amount verified in operation 1320 exceeding the threshold value, the production line designer terminal 110 performs operation 1340. In response to the production amount verified in operation 1320 being less than or equal to the threshold value, the production line designer terminal 110 repetitively performs operation 1310 until the production amount exceeds the threshold value.

In operation 1340, the production line designer terminal 110 designs the production line using an assembly module having a production amount greater than the threshold value.

In operation 1350, the production line designer terminal 110 transmits, to an onsite production line installer terminal 120, design information of the production line designed in operation 1340. The design information, also referred to herein as production line design information, may include arrangement information of assembly modules included in the production line and configuration information of each of the assembly modules.

According to example embodiments described herein, an optimized production line may be designed by simulating a designed production line and verifying in advance whether the designed production line satisfies a target production amount.

According to example embodiments described herein, by transmitting design information of a production line to an onsite production line installer and arranging standardized RAMs, and verifying a configuration state of each of assembly tool components connected to the RAMs through a network, the production line may be configured or reconfigured more rapidly and accurately.

The components described in the example embodiments of the present disclosure may be achieved by hardware components including at least one of a digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of designing a production line using a production line designer terminal including a production line configuring tool and a production line simulator, the production line configuring tool including components as assembly tools, the method comprising:
   providing one or more production processes in a production line;
   arranging reconfigurable assembly modules (RAMs) for each production process of the production line, the RAMs being combined with the components as assembly tools which are selected to perform each production process;

verifying a production amount of the RAMs using the production line simulator;

designing the production line composed of the RAMs that are verified to have a production amount greater than or equal to a threshold value; and transmitting design information of the designed production line to an onsite production line installer terminal.

2. The method of claim 1, wherein the design information of the designed production line includes:

arrangement information of the RAMs in the production line; and configuration information of the RAMs in the production line.

3. A method of verifying design of one or more reconfigurable assembly modules (RAMs), the method comprising:

searching for components as assembly tools combined with the one or more RAMs based on design information of a production line;

transmitting a list of the searched components based on the design information to a production line designer terminal;

verifying that the searched components correspond to the design information of the production line by the production line designer terminal;

in response to the production line designer terminal confirming that the searched components correspond to the design information of the production line, transmitting to the production line designer terminal a production line arrangement verification request message to verify that arrangement of the production line matches the arrangement configured by the production line designer terminal; and receiving, from the production line designer terminal, a name and an identification number of a production process to be performed by the one or more RAMs.

4. The method of claim 3, wherein the production line designer terminal:

includes a production line configuring tool and a production line simulator, the production line configuring tool including components as assembly tools;

executes instructions to arrange one or more RAMs for each production process using the components as assembly tools which are selected to perform each production process; and executes instructions to design a production line composed of the one or more RAMs that are verified to have a production amount greater than or equal to a threshold value using the production line simulator.

5. The method of claim 3, wherein when no component is absent from the list of the searched components for the one or more RAMs in the design information of the production line, the production line designer terminal confirms that the searched components correspond to the design information of the production line.

6. A method of reconfiguring a production line using a production line designer terminal including a production line configuring tool and a production line simulator, the production line configuring tool including components as assembly tools, the method comprising:

providing one or more production processes in a production line;

arranging one or more reconfigurable assembly modules (RAMs) for the one or more production processes of the production line, and estimating a production amount of the one or more RAMs using the production line simulator;

designing the production line based on the result of estimating of the production amount of the one or more RAMs;

receiving, from the one or more RAMs configured based on design information of the production line, a list of components as assembly tools which are selected to perform the one or more production processes and combined with the one or more RAMs based on the design information of the production line;

verifying that each of the components of the one or more RAMs corresponds to the design information of the production line;

receiving, from the one or more RAMs, a production line arrangement verification request message to verify that the arrangement of the production line corresponds to the design information; and transmitting, to the one or more RAMs, a name and an identification number of a production process to be performed by the one or more RAMs.

7. The method of claim 6, wherein the designing of the production line comprises designing the production line composed of the one or more RAMs that are verified to have a production amount greater than or equal to a threshold value.

8. The method of claim 6, wherein the design information of the production line includes:

arrangement information of the one or more RAMs in the production line, and configuration information of the one or more RAMs in the production line.

9. The method of claim 6, wherein the verifying of each of the components of the one or more RAMs comprises:

when no component is absent from the list of components for the one or more RAMs in the design information of the production line, confirming that the components for the one or more RAMs correspond to the design information of the production line.

\* \* \* \* \*